J. W. FRY.
Nippers for Twisting Wire.
No. 145,794.  Patented Dec. 23, 1873.
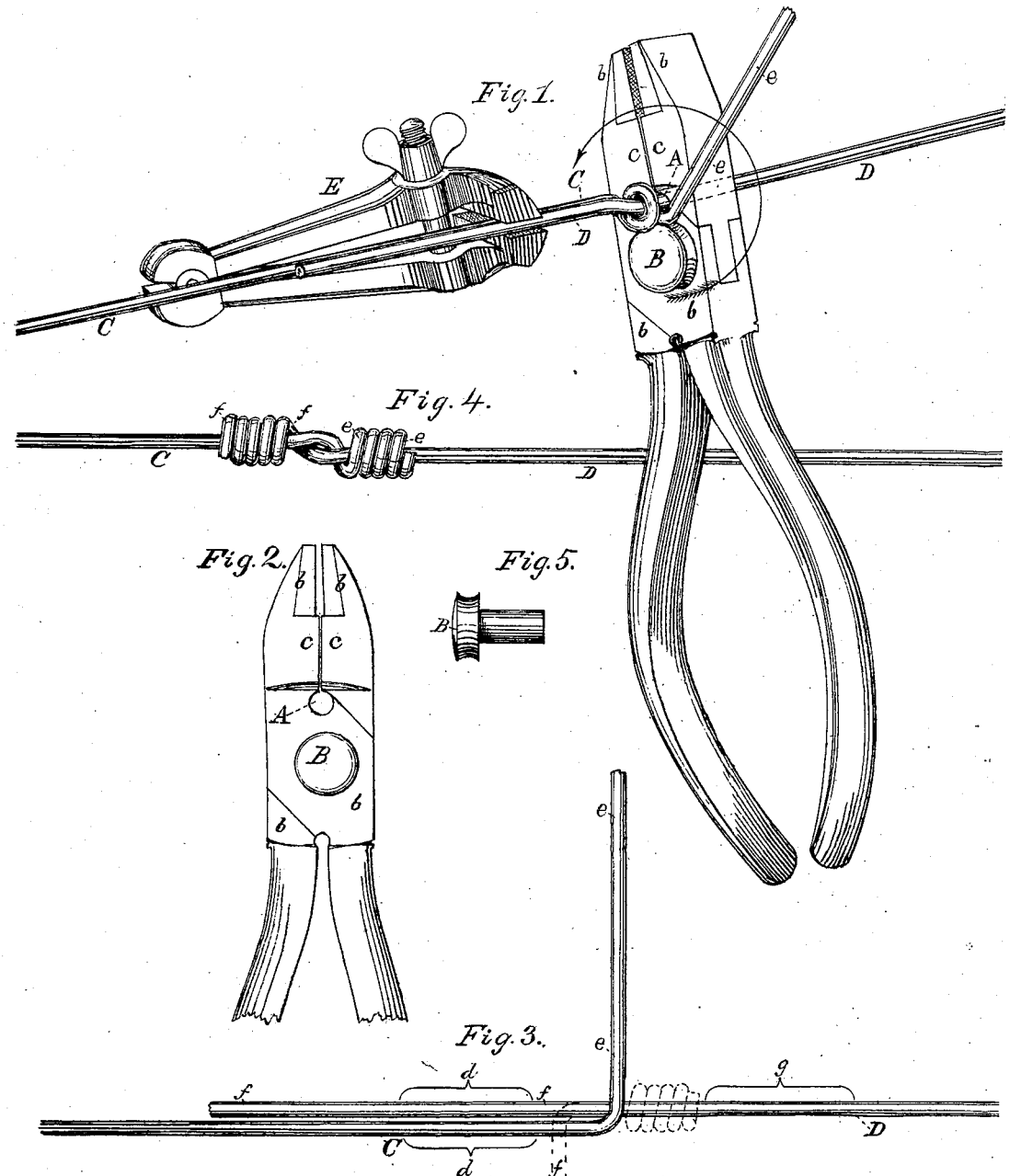

UNITED STATES PATENT OFFICE.

JOHN W. FRY, OF PANAMA, UNITED STATES OF COLOMBIA.

IMPROVEMENT IN NIPPERS FOR TWISTING WIRE.

Specification forming part of Letters Patent No. 145,794, dated December 23, 1873; application filed May 24, 1873.

*To all whom it may concern:*

Be it known that I, JOHN W. FRY, formerly of Elizabeth, in the State of New Jersey, but now a resident of Panama, in the United States of Colombia, have invented Improvements in Telegraph-Pinchers, of which the following is a specification:

This invention relates to that class of tools or nippers for splicing or twisting telegraph and other wires, in which a hole is arranged between the jaws of the nippers, through which one of the wires is passed and the other wire twisted or wrapped around it by the rotation of the nippers upon the wire passed through the hole, and its object is to produce a nippers or pinchers of this class which may be simpler in construction, cheaper to manufacture, and which will not be unfitted for the ordinary uses to which nippers are put, as well as being of more easy and effective operation; and it consists in forming a boss on the extension of the rivet that connects the jaws together, said jaws being provided with a hole, in such a manner that the boss abutting against one wire twists or wraps it around the wire passed through the hole as the pinchers are rotated thereon.

In the accompanying drawings, Figure 1 is a perspective view, representing my improved pinchers in operation. Fig. 2 is an elevation of the pinchers, showing my improvements. Fig. 3 represents the ends of the wires before being spliced. Fig. 4 represents the same when the splice is completed, and Fig. 5 shows the mode of forming the projecting boss.

As represented in the drawings, b b are the jaws of the pinchers, between which is formed a hole, A, at the lower part of the jaws, and immediately below the cutters c c, as shown in Fig. 2. At a short distance below the hole A is arranged a boss or stud, B, at the center or joint on which the jaws move. The stud projects some distance beyond the jaws, as shown in Fig. 1, about equal to the thickness of the wire ordinarily used for the purpose, and its periphery is grooved, as shown in Fig. 1. The boss B is formed from the head of the rivet by which the jaws are jointed to each other, by forming said head of a suitable diameter and thickness, and providing its periphery with a semicircular groove, as shown in Fig. 5.

In Fig. 3, C D represent the wires to be spliced. A suitable portion of the end of the wire C is first bent at right angles, as shown at e, and the two wires held securely in a hand-vise at about the position d d, Fig. 3, as shown in Fig. 1. The jaws of the pinchers are then opened and the wire D allowed to enter the hole A, when the pinchers are slid upon the wire until the grooved periphery of the stud B is in contact with the bent portion e of the wire C, as shown in Fig. 1. The pinchers are then rotated in the direction of the arrow in Fig. 1, revolving on the wire D as an axis, the straight portion of the wires C D being held stationary by the hand-vise E, the effect of which is to securely wrap or twist the projecting or bent portion e of the wire C spirally around the wire D, as shown by the dotted lines in Fig. 3, and full lines in Fig. 4. When this part of the splice is completed, the wire D is held by the hand-vise at about the position g g, and its end portion f f bent at right angles into the position represented by the broken lines in Fig. 3. The pinchers are then placed on the wire C, and the stud B placed in contact with the bent portion f f of the wire D, and the pinchers rotated, as before described, thus wrapping the bent portion f f of the wire D around the wire C, when the splice is then completed, and appears as shown in Fig. 4.

By my invention the pinchers are in no way unfitted for ordinary uses, as neither the hole A between the jaws, nor the raised boss B upon the rivet that connects the jaws together, detracts in any way from the ordinary capabilities of this class of tools, as will be obvious upon examination, as also that these devices may be applied to any ordinary nippers with very little trouble or expense; and, moreover, the strain upon the nippers in splicing or twisting one wire around the other has no tendency to open the jaws, as in other tools for this purpose, and it can also be instantly adjusted to the working position to splice the wires, and more leverage is secured for the same length of tool, as the work is performed just at the fulcrum, thus rendering the operation of the tool much more easy, rapid, and effective.

I do not claim a nippers for twisting wires like that shown in Patent No. 130,778, in which a hole is formed between the jaws for the reception of one wire, and the wire to be twisted is nipped by lateral jaws provided with grooves for its reception, and wrapped around the other wire by the rotation of the nippers thereon; but

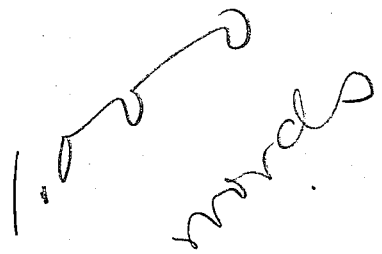

What I claim as my invention, and desire to secure by Letters Patent, is—

The boss B, formed on the extension of the rivet that connects the jaws together, in combination with the jaws $b\ b$, having the hole A, substantially as and for the purpose specified.

In witness whereof I have hereunto signed my name in the presence of two subscribing witnesses.

JOHN W. FRY.

Witnesses:
 OWEN M. LONG,
 L. MISNER.